United States Patent
Hobbs

(10) Patent No.: US 8,766,993 B1
(45) Date of Patent: Jul. 1, 2014

(54) METHODS AND APPARATUS FOR ENABLING MULTIPLE REMOTE DISPLAYS

(75) Inventor: David V. Hobbs, Surrey (CA)

(73) Assignee: Teradici Corporation, Burnaby, British Columbia (CA)

(*) Notice: Subject to any disclaimer, the term of this patent is extended or adjusted under 35 U.S.C. 154(b) by 1384 days.

(21) Appl. No.: 11/278,128

(22) Filed: Mar. 30, 2006

Related U.S. Application Data

(60) Provisional application No. 60/669,178, filed on Apr. 6, 2005.

(51) Int. Cl.
*G06F 13/00* (2006.01)

(52) U.S. Cl.
USPC ........... 345/536; 345/537; 345/538; 345/539; 345/540

(58) Field of Classification Search
CPC ......... G09G 5/393; G09G 5/399; G09G 5/14; G06T 1/60
USPC ........................... 345/536, 537, 538, 539, 540
See application file for complete search history.

(56) References Cited

U.S. PATENT DOCUMENTS

| | | | | |
|---|---|---|---|---|
| 5,018,076 | A * | 5/1991 | Johary et al. | 345/573 |
| 5,526,017 | A * | 6/1996 | Wilkie | 345/629 |
| 6,012,101 | A * | 1/2000 | Heller et al. | 709/250 |
| 6,038,616 | A * | 3/2000 | Thornton et al. | 710/2 |
| 6,046,751 | A * | 4/2000 | Kato et al. | 345/501 |
| 6,119,146 | A * | 9/2000 | Heller et al. | 709/203 |
| 6,252,979 | B1 * | 6/2001 | Lee et al. | 382/133 |
| 6,333,750 | B1 * | 12/2001 | Odryna et al. | 345/629 |
| 6,385,666 | B1 * | 5/2002 | Thornton et al. | 710/2 |
| 6,483,515 | B1 * | 11/2002 | Hanko | 345/545 |
| 6,570,890 | B1 | 5/2003 | Keenan et al. | |
| 6,806,885 | B1 * | 10/2004 | Piper et al. | 345/545 |
| 7,043,748 | B2 * | 5/2006 | Thornton et al. | 725/78 |
| 7,095,386 | B2 * | 8/2006 | Alben et al. | 345/3.1 |
| 7,133,362 | B2 | 11/2006 | Chu et al. | |
| 7,136,394 | B2 | 11/2006 | Horowitz et al. | |
| 7,161,557 | B2 | 1/2007 | Thornton | |
| 7,317,685 | B1 | 1/2008 | Flott et al. | |
| 2001/0000539 | A1 * | 4/2001 | Heller et al. | 710/62 |
| 2001/0011965 | A1 * | 8/2001 | Wilks | 345/1.1 |
| 2002/0059639 | A1 * | 5/2002 | Thornton et al. | 725/135 |
| 2002/0149617 | A1 | 10/2002 | Becker | |
| 2002/0180725 | A1 | 12/2002 | Simmonds et al. | |

(Continued)

OTHER PUBLICATIONS

"Zero Client Technology: History, Use and Critical Comparison", Applica Inc., Web Article (http://www.applica.com/zeroCtech.shtml), 4 pages, Copyright 1997-2005.

(Continued)

*Primary Examiner* — Abderrahim Merouan
(74) *Attorney, Agent, or Firm* — Lewis Roca Rothgerber LLP

(57) ABSTRACT

A method of transmitting visual data from a host computer to multiple displays across a computer network is disclosed. Visual data is stored in a plurality of frame buffers, each frame buffer associated with a separate display. A frame buffer update sequence is determined, with operations to be performed on frame buffers in the plurality. The data stored in the plurality of frame buffers is encoded as specified by the buffer update sequence to yield encoded images and each encoded image is sent across a computer network to the separate display associated with the frame buffer from which the encoded image was derived.

27 Claims, 8 Drawing Sheets

Wide Display System Architecture

(56) References Cited

U.S. PATENT DOCUMENTS

| | | | | |
|---|---|---|---|---|
| 2003/0098820 | A1* | 5/2003 | Someya et al. | 345/1.3 |
| 2003/0193486 | A1* | 10/2003 | Estrop | 345/204 |
| 2003/0208340 | A1* | 11/2003 | Dorough | 702/188 |
| 2003/0212811 | A1* | 11/2003 | Thornton | 709/231 |
| 2004/0001622 | A1* | 1/2004 | Roylance et al. | 382/166 |
| 2004/0015597 | A1* | 1/2004 | Thornton | 709/231 |
| 2004/0212730 | A1* | 10/2004 | MacInnis et al. | 348/441 |
| 2004/0222941 | A1* | 11/2004 | Wong et al. | 345/1.1 |
| 2005/0060421 | A1* | 3/2005 | Musunuri et al. | 709/231 |
| 2005/0204015 | A1* | 9/2005 | Steinhart et al. | 709/217 |
| 2005/0257239 | A1* | 11/2005 | Evans et al. | 725/88 |

OTHER PUBLICATIONS

Dale Beermann, Greg Humphreys, "Visual Computing in the Future: Computer Graphics as a Remote Service", University of Virginia, Computer Science Department, University of Virginia Technical Report CS-2003-16, 25 pages, Jun. 1, 2003.

William Blanke, Chandrajit Bajaj, Donald Fussell, and Xiaoyu Zhang,"The Metabuffer: A Scalable Multiresolution Multidisplay 3-D Graphics System Using Commodity Rendering Engines", TR2000-16, The University of Texas at Austin, 7 pages, Feb. 2000.

Han Chen, Yuqun Chen, Adam Finkelstein, Thomas Funkhouser, Kai Li, Zhiyan Liu, Rudrajit Samanta, and Grant Wallace, "Data distribution strategies for high-resolution displays", Computers & Graphics. vol. 25, No. 5, pp. 811-818, Oct. 2001.

A. Heirich and L. Moll, "Scalable distributed visualization using off-the-shelf components", IEEE Parallel Visualization and Graphics Symposium—1999, San Francisco, California, pp. 55-59, Oct. 1999.

Greg Humphreys, Matthew Eldridge, Ian Buck, Gordon Stoll, Matthew Everett, and Pat Hanrahan, "WireGL: A Scalable Graphics System for Clusters", Computer Graphics (SIGGRAPH 2001), 12 pages, 2001.

Tristan Richardson, Quentin Stafford-Fraser,Kenneth R. Wood and Andy Hopper,"Virtual Network Computing", Reprint from IEEE Internet Computing, vol. 2, No. 1, 7 pages, Jan./Feb. 1998.

"OpenGL Vizserver™3.1 Application-Transparent Remote Interactive Visualization and Collaboration", White Paper, Silicon Graphics Inc., 15 pages, 2003.

Rajvikram Singh, Byungil Jeong, Luc Renambot, Andrew Johnson, Jason Leigh, "TeraVision: a Distributed, Scalable, High Resolution Graphics Streaming System", Proceedings of Cluster 2004, San Diego, CA, 10 pages, Sep. 2004.

Applica Presenter Product Datasheet, SmartAVI, Inc, 3111 Winona Ave, Suite 101 Burbank, CA 91504, 4 pages, (No Date).

Roger Zimmermann and Dwipal A. Desai, "Ethernet Interface for Head-Mounted Displays", USC Technical Report USC-CS-TR05-846, Integrated Media Systems Center, University of Southern California, 12 pages, Mar. 2005.

"Applica Presenter Product Datasheet," SmartAVI, Inc, 3111 Winona Ave, Suite 101 Burbank, CA 91504, 4 pages, (No Date).

* cited by examiner

System with Multiple Remote Displays

Host Display Encoder

Display Encoder on System Bus

Display Encoder on Image Data Bus

Wide Display System Architecture

Wide Display Frame Buffer Update Method

Multi-Display Remote Unit

Display Update Method

METHODS AND APPARATUS FOR ENABLING MULTIPLE REMOTE DISPLAYS

RELATED APPLICATION

This application claims priority to Provisional Patent Application Ser. No. 60/669,178, filed Apr. 6, 2005, incorporated herein by reference in its entirety.

FIELD

The present invention relates generally to methods and apparatus for enabling remote display systems to connect to a computer system. More specifically, the invention provides methods and apparatus for enabling a computer system that generates entire display images of different resolutions to encode the different images and transmit them to remote multi-user and multi-monitor environments.

BACKGROUND

Advances in computer technology have made it economical for individual users to have their own computing system, which caused the proliferation of the Personal Computer (PC). Continued advances of this computer technology have made these personal computers very powerful but also complex and difficult to manage. For this and other reasons there is a desire in many workplace environments to separate the user interface devices, including the display and keyboard, from the application processing parts of the computing system. In this preferred configuration, the user interface devices are physically located at the desktop, while the processing and storage components of the computer are placed in a central location. The user interface devices are then connected to the processor and storage components with some method of communication.

One of the challenges with this approach relates to methods for providing users with multiple computer monitor configurations on their desktop with the identical user experience compared with multiple computer monitors connected to a local desktop computer system. These users include users in the financial services or CAD industries whose computers allow applications to spread across multiple displays from their local desktop computer.

The challenge with this configuration lies in the effective relay of images from multiple frame buffers at the data processing side of the system across the network to the desktop for display across multiple monitors at perceptually lossless image quality and within the latency limits of human perception.

Local computing platforms commonly use multiple frame buffers. As one example, Windows XP supports multiple local monitors to increase the active desktop area. As another example, gaming application use multiple frame buffers to enhance animated graphics. Less common methods for connecting multiple frame buffers to multiple remote monitors are described below.

One method for supporting multiple remote monitors connected to a data processor network by a standard network involves the copying of frame buffers from the data processor to the client equipment. One implementation of the frame buffer copy method is Virtual Network Computing (VNC). VNC uses a software driver on the data processor to read and compress the frame buffer on the data processor using delta buffer or other software-based compression methods. The compressed data is copied to the remote system using the Remote Frame Buffer protocol (RFB) on request by a client version of the VNC software which runs on the remote computer system. Some versions of VNC, such as the one provided by RealVNC support multiple displays by simultaneously connecting to different ports on the data processing system.

VNC has limited graphics support. While text and 2D graphics are drawn to a frame buffer in system memory, 3D graphics are usually handled by a GPU and not drawn to a frame buffer accessible to the VNC driver. This results in 3D windows left as blank areas on the client system. While one workaround is to use software to render 3D objects such as those drawn using 3D OpenGL, this approach is undesirable as it requires the data processor to perform drawing operations. VNC also effects data processing performance directly by sharing frame buffer access with the CPU and requiring CPU resources for data compression. Unlike VNC, which has limited 3D graphics support, VizServer™ from Silicon Graphics is a dedicated 3D rendering server which uses a multi-processing server to render and transmit display images to remote users. Using general purpose CPUs for the compression of frame buffers is inefficient. For example, it is recommended that several dedicated processors are added to a VizServer systems to support the compression and copy of the frame buffer.

Another method for forwarding display information to the remote displays is the graphic command transfer method. X-Windows is one product that uses this method in a UNIX environment. X-Windows forwards drawing commands to the client system and requires that the client system supports the rendering hardware to draw the image at the remote system. To reduce the bandwidth needed by X-Windows, Low-Bandwidth X (LBX) is a proxy module that compresses the command stream before transmission. A major problem with the X-based solution is the requirement for remote operating system and graphics hardware to support the display application. This increases the desktop equipment cost and maintenance overheads which defeats the original objective of separating the data processor from the user interface components.

A brute force approach to enabling a system with multiple monitors is to integrate multiple parallel Keyboard-Video-Mouse (KVM) systems in the data processor, each with a dedicated connection to a remote monitor. KVM systems that use dedicated CAT5 or fiber cabling have distance limitations, and are costly to install and maintain due to the non-standard infrastructure requirements. KVM over IP systems use either frame buffer copy or graphic command transfer methods to copy the display information to the remote monitors and consequently suffer similar limitations to those systems described above.

A related market that uses multiple remote displays is the emerging Head Mount Display (HMD) industry. A typical head mount display is comprised of dual micro-displays, each displaying one channel of a stereo image. In most existing systems, separate analog video signals are run directly from the processing environment; however in-line architectures that capture and compress DVI signals for Ethernet and wireless transmission to a remote HMD have recently been proposed.

In summary, existing software methods for transferring display information to individual remote clients with multiple monitors have limited capabilities, consume data processing resources and usually require a client software application to reformat the incoming display image to meet size and resolution requirements of the display area or even render the image based on transferred graphic commands. This requires complex and expensive client systems with relatively high maintenance requirements. Physical video cable extension techniques require additional cabling and have limited distance of operation.

SUMMARY OF THE INVENTION

The invention provides methods and apparatus for enabling the separation of multi-user and multiple monitor digital display systems from a centralized computer using a standard network. This enables remote users to experience a high quality visual interface with little or no overhead imposed on the centralized computer system and using simple remote display components.

In one aspect, the invention provides methods for enabling a central computing system to render multiple independent images in frame buffers that match the pixel resolution and size of different target displays while an independent encoding module encodes and transmits the images to multiple remote display systems at the intended pixel resolution without impacting the performance of the central computer. This allows central computing systems to generate multiple independent images using anti-aliasing and other image enhancement methods without having the benefits lost during transmission and reformatting.

In another aspect, the invention provides a display encoder module with independent memory that stores copies of the computer frame buffers. This allows the encoding and transmission of images to multiple remote systems independent of computer processing. Unlike software-based screen scraping methods, a separate encoding module enables the selection of encoding methods and adjustment of image update rates to match remote display capabilities, timing and network conditions. The encoding module operates independent of the original image generation and without impacting the performance of the computing system.

In another aspect, the invention provides methods for multiple independent remote display systems to each display a partial image such that a wide image may be displayed by locating the monitors side by side.

In another aspect, the invention provides methods for a single remote decoder, display controller and de-multiplexer to display wide images across multiple displays.

In summary, the invention offers many benefits over existing methods of supporting multiple remote displays. Unlike software-based frame buffer copy methods, the invention does not reduce host computer performance by constantly polling frame buffers and is not limited to 2D graphics support. Neither does it require reformatting of frame buffer images to match remote display capabilities, thereby losing the advantage of features such as anti-aliased fonts. Unlike graphic command transfer methods, the method does not require complex or expensive remote components such as CPU, GPU or operating system. Unlike physical video cable extension techniques, the methods and apparatus described operate over existing standard corporate network infrastructure and are not subject to distance limitations. Many other features and advantages of the present invention will be realized upon reading the following detailed description, when considered in conjunction with the accompanying drawings, in which:

DETAILED DESCRIPTION

Figure 1:
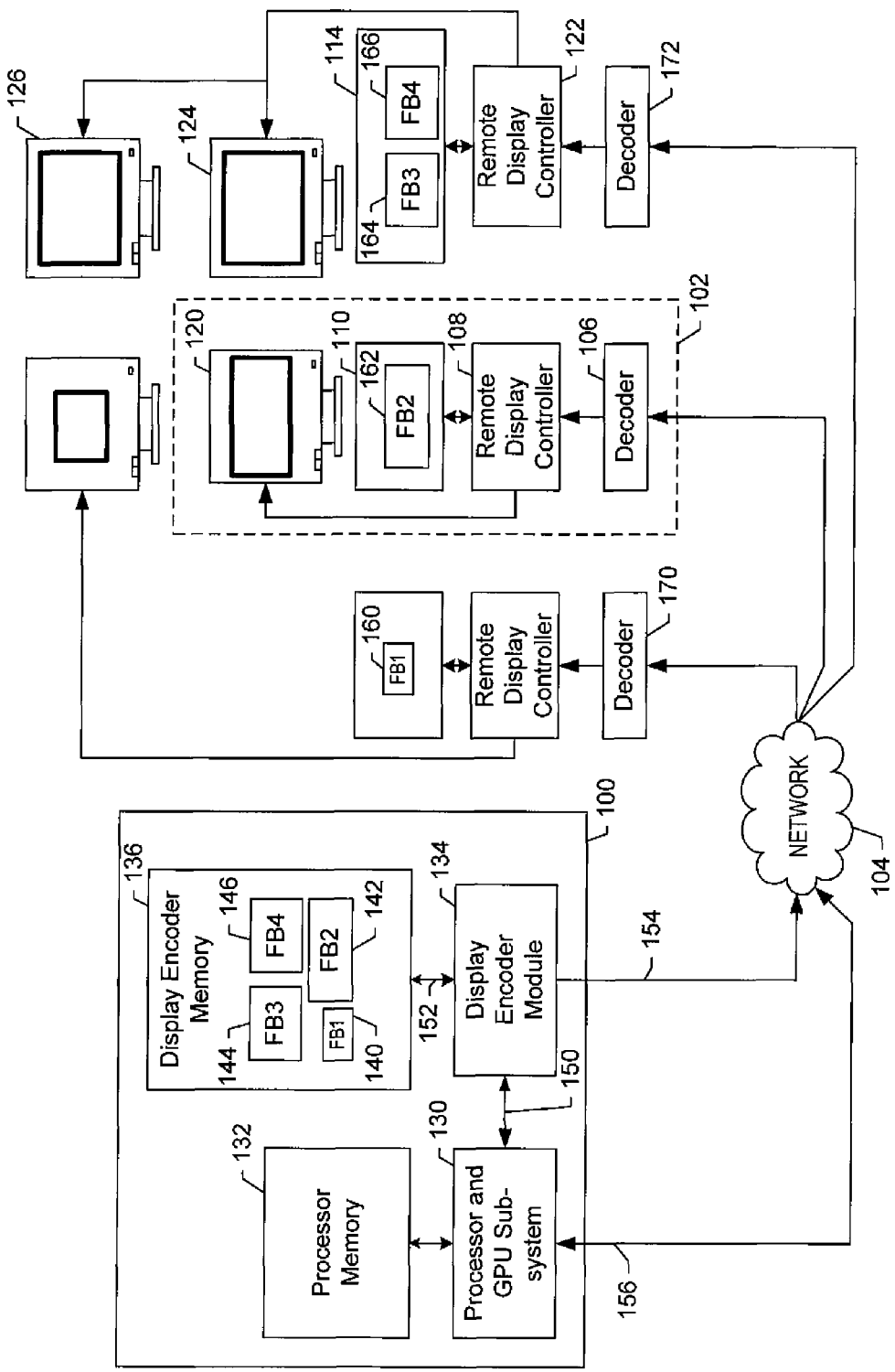
FIG. 1 illustrates an embodiment of a multiple remote display environment in which a host computer system is connected to multiple remote display systems by network.

FIG. 1 illustrates an embodiment of a multiple remote display environment. An example of such an environment is a centralized PC or server connected to multiple computer monitors across a network. In the environment described, the host computer system may be aware of the display capabilities of each of the remote display systems and may be capable of rendering different display images for each remote display such that the image attributes, such as pixel resolution, aspect ratio and size exactly match the capabilities of the target display.

Referring to FIG. 1, host computer system 100 is connected to multiple remote display systems by network 104. Host computer system 100 may be a sub-system within a personal computer (PC), it may be a stand-alone PC, or it may be a server. An example of network 104 is an Ethernet-based corporate IP network. In the embodiment shown, remote display system 102 is one of the remote display systems and is comprised of decoder 106 connected to remote display controller 108 with associated remote display memory structure 110 incorporating remote frame buffer 162. In some remote memory embodiments, such as remote memory 114, multiple frame buffers are incorporated (frame buffers 164 and 166 shown). Remote display controller 108 is connected to remote monitor 120. Some remote display systems support multiple monitors, such as monitors 124 and 126 supported by remote display controller 122.

Host computer system 100 includes processor and GPU sub-system 130 and its associated processor memory 132, connected via data connection 150 to display encoder module 134. Display encoder module 134 is connected to display encoder memory 136 by data connection 152. Processor and GPU sub-system 130 includes one or more central processing units (CPUs) optionally coupled with one or more graphics processing units (GPUs) and may also be connected to network 104, for example using connection 156 illustrated. In the embodiment, display encoder memory 136 incorporates multiple independent frame buffers, including frame buffer memory areas 140, 142, 144 and 146 shown. Frame buffer memory areas 140, 142, 144 and 146 each have a pixel resolution and size based on the attributes of one or more associated remote displays and therefore each framebuffer may have different pixel resolution and dimensions. Other configurations of display encoder memory with more or fewer frame buffers are also feasible.

In the embodiment shown, visual information derived by software applications on host computer system 100 targeting different display monitors is written to frame buffers in processor memory 132. Each frame buffer may exactly match the pixel resolution and size of the corresponding target display, allowing images to be rendered using anti-aliased fonts or other display enhancement features useful for digital displays. In cases where images generated by host applications do not exactly match the pixel resolution and size of the target display, processor and GPU sub-system 130 have the ability to reformat or resize the image to match the display.

Display encoder module 134 reads frame buffers in processor memory 132 and stores the frame buffer information in independent frame buffers in display encoder memory 136. The present invention employs methods to prevent display encoder module 134 from continuously polling or reading all frame buffers in processor memory 132 which adversely impacts system performance. These methods are discussed in the description of FIG. 2.

In an alternative embodiment, visual information derived by software applications on host computer system 100 is written directly to display encoder module 134 where it is stored in independent frame buffers in display encoder memory 136.

Display encoder module 134 then accesses frame buffer memory areas 140, 142, 144 and 146 in display encoder memory, independently encodes the display images associated with each remote display system and transmits encoded data from connection 154 across network 104 to their designated decoder(s). In the embodiment shown in FIG. 1, the image in frame buffer 140 is transmitted to decoder 170, the image in frame buffer 142 is transmitted to decoder 106 and the images in frame buffers 144 and 146 are transmitted to decoder 172 where they are decoded and stored in frame buffers 116 and 118 of remote memory 114. Decoders 102, 170 and 172 receive the display information, decode it and write it to the appropriate remote frame buffer where it is available for display on the appropriate remote monitor.

Figure 2:
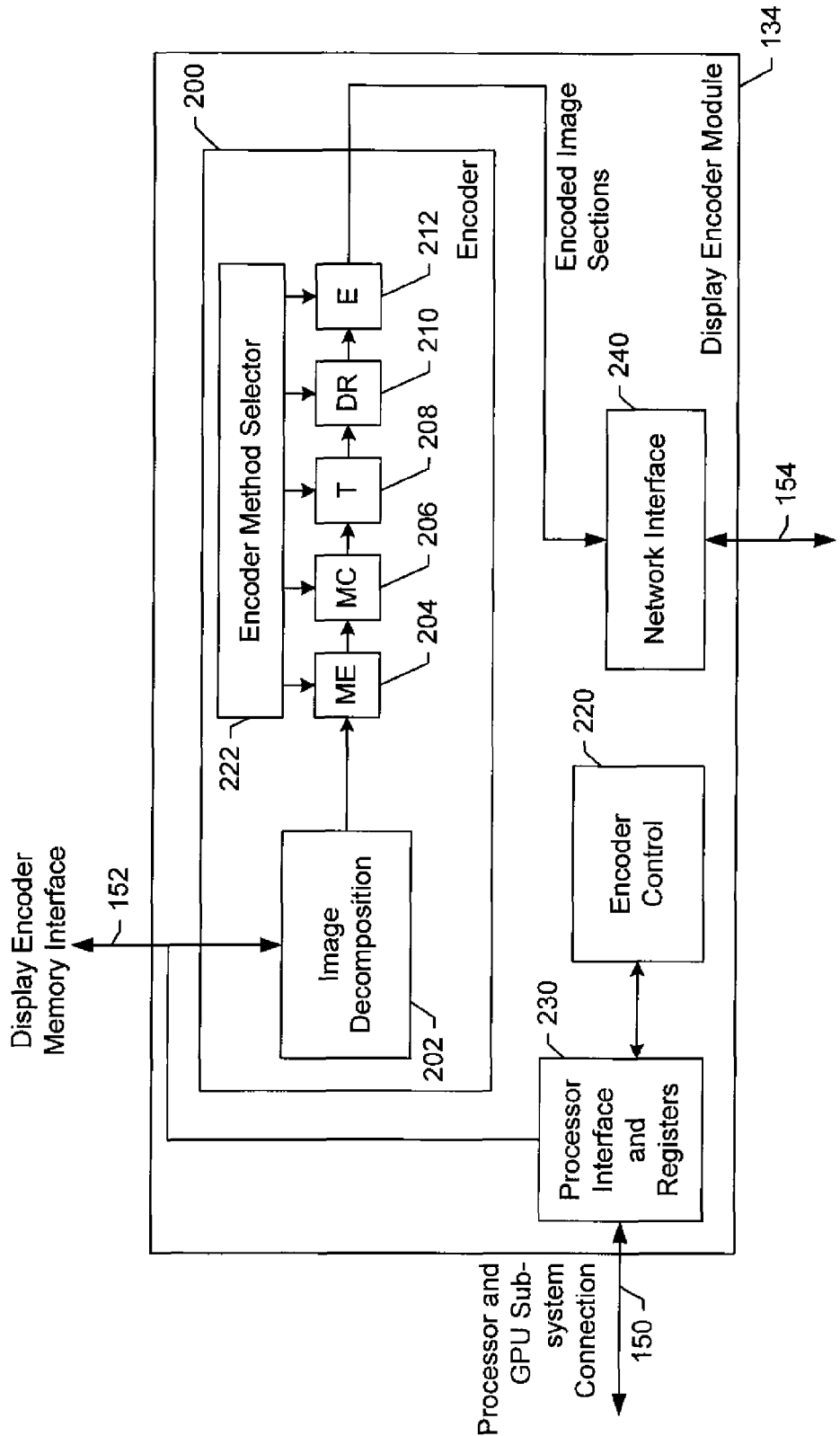
FIG. 2 illustrates the internal architecture of a display encoder module.

FIG. 2 illustrates the internal architecture of an embodiment of display encoder module 134 that decomposes and compresses the display sections of different frame buffers. In the embodiment, display encoder module 134 is comprised of several modules. Processor interface and registers 230 provides connection 150 to processor and GPU sub-system 130. In one embodiment, connection 150 is a PCI-Express connection to processor and GPU sub-system 130 and processor interface and registers 230 provide a PCI-Express bus interface.

In an embodiment, connection 150 is a Digital Packet Video Link (DPVL) connection and processor interface and registers 230 captures the DPVL streams for each display and stores them in different frame buffers in display encoder memory 136.

In another embodiment, connection 150 is a set of Digital Visual Interface (DVI) connections and processor interface and registers 230 captures the DVI stream for each display and stores them in different frame buffers in display encoder memory 136.

In yet another embodiment, connection 150 is a VGA connection and processor interface and registers 230 provides VGA registers each display and stores the frame buffer for each display in display encoder memory 136.

Encoder control 220 controls which frame buffer of display encoder memory to access and which region to access based on which regions have changed and require transmission. In an embodiment that copies frame buffers from processor memory 132 to display encoder memory 136, encoder control 220 is responsible for copying frame buffer information. Various methods exist to prevent display encoder module 134 from repeatedly polling frame buffers in processor memory 132, which adversely impacts system performance. One method uses a software table that tracks regions of processor memory that have been updated. This table may be maintained by the CPU, which monitors graphic commands and determines which areas of processor memory 132 are being updated. Changed areas are marked for reading in the software table. Display encoder module 134 then reads only areas marked in the software table and resets the table once the areas have been copied to display encoder memory 136. An alternative method is to monitor dirty bits. Some CPUs include a memory management unit (MMU) with hardware sticky bits that are set when corresponding regions of memory have been written. In this embodiment, display encoder module 134 queries the MMU to establish which areas of processor memory 132 have been updated and instructs the CPU to reset the sticky bits once the memory has been read.

Multi-method encoder 200 includes an enhanced image encoding pipeline, controlled by encoder method selector 222 that selects encoding combinations to support different image content including lossy methods for natural images or lossless methods for computer generated text or graphic images. The encoder may also be tunable to different variations in image content such as color depth, etc. In the embodiment, the first stage in the encoder is image decomposition module 202, which classifies the image type as a precursor to the encoding operation, which enables encoding based on image classification. Decomposition module 202 classifies the image into different image types such as background, text, picture or object layers based on spatial and temporal features such as contrast, color content, etc. Image type may be determined using image analysis methods or interpreting drawing commands. An example of an image analysis method is an image filter such as a text recognition filter. Decomposition module 202 separates the image into layers and different layers are subjected to different encoding methods in the pipeline. The other stages in the encoding pipeline include motion estimation (ME) 204, motion compensation (MC) 206, discrete cosine transform DCT and/or discrete wavelet transform DWT stage (T) 208, data reordering stage (DR) 210, and entropy (E) encoding stage 212. Other stages can be included, depending on specific implementations of the present invention. The data reordering stage includes lossless data reordering operations e.g. color cache, LZW, run length coding, mask or data predictors, etc. The entropy encoding stage uses suitable encoders like arithmetic, Golumb or Huffman coders.

Network Interface 240 provides packetization, network controller and transport layer interface functions. For example, packetized encoded data may be encapsulated using UDP/IP packetization and connection 154 may be an Ethernet LAN connection.

Figure 3:
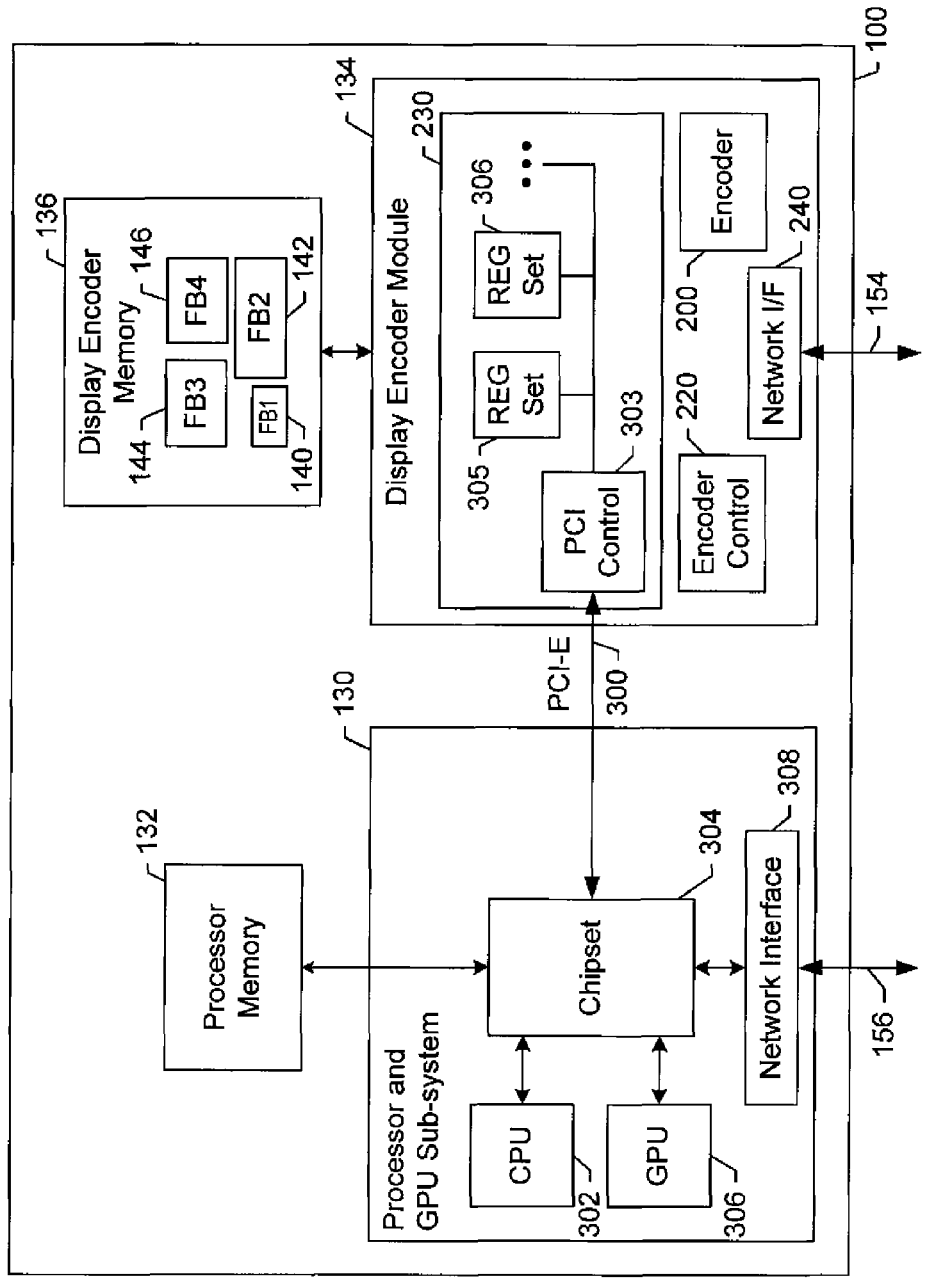
FIG. 3 shows a host computer system with display encoder module connected to a processor and GPU sub-system by a PCI Express bus.

FIG. 3 shows an embodiment of host computer system 100 with display encoder module 134 connected to processor and GPU sub-system 130 by PCI Express bus 300. In the embodiment shown, CPU 302 connects to processor memory 132 using chipset 304. Chipset 304 also provide PCI-Express interconnect 300 to display encoder module 134. In one alternative embodiment, chipset 304 supports GPU 306, connected using PCI-Express or a graphics data bus such as AGP. In another alternative embodiment, chipset 304 provides network interface 308 for CPU 302 to gain access to the remote display systems and other networked devices connected to network 104.

Processor interface and registers 230 of display encoder module 134 include PCI Express control module 303 connected to multiple display controller register sets, including but not limited to register sets 305 and 306 shown. Each register set presents itself as an independent display controller interface and each of these display controller interfaces has its own separate frame buffer. For example, in FIG. 3, frame buffer memory 140 may be associated with register set 305 and frame buffer memory 142 may be associated with register set 306.

Each display controller interface and associated register set is capable of being set to the same default display controller interface of processor and GPU sub-system 130. One such example of a standard display controller interface and registers is the VGA interface.

In a virtual machine embodiment, such as the case when virtualization software such as VMWare or Xen runs on processor and GPU sub-system 130, display encoder module 134 is instructed as to which display interface should be active at any given time and encoder control module 220 responds by controlling which frame buffer and register set is active. In the embodiment, the virtual machine software coordinates the virtual machine environment such that each virtual machine appears to have its own dedicated display interface. Display encoder module 134 then accesses the frame buffers in processor memory 132, encodes the display information and transmits each encoded frame buffer across network 104 to a designated remote display system. In an alternative embodiment, the virtual machine environment writes image information to different address-mapped regions of display encoder module 134, each region mapping to a different frame buffer in display encoder memory 136. Display encoder module 134 then accesses the frame buffers in display encoder memory 136, encodes the display information and transmits each encoded frame buffer across network 104 to a designated remote display system.

Figure 4:
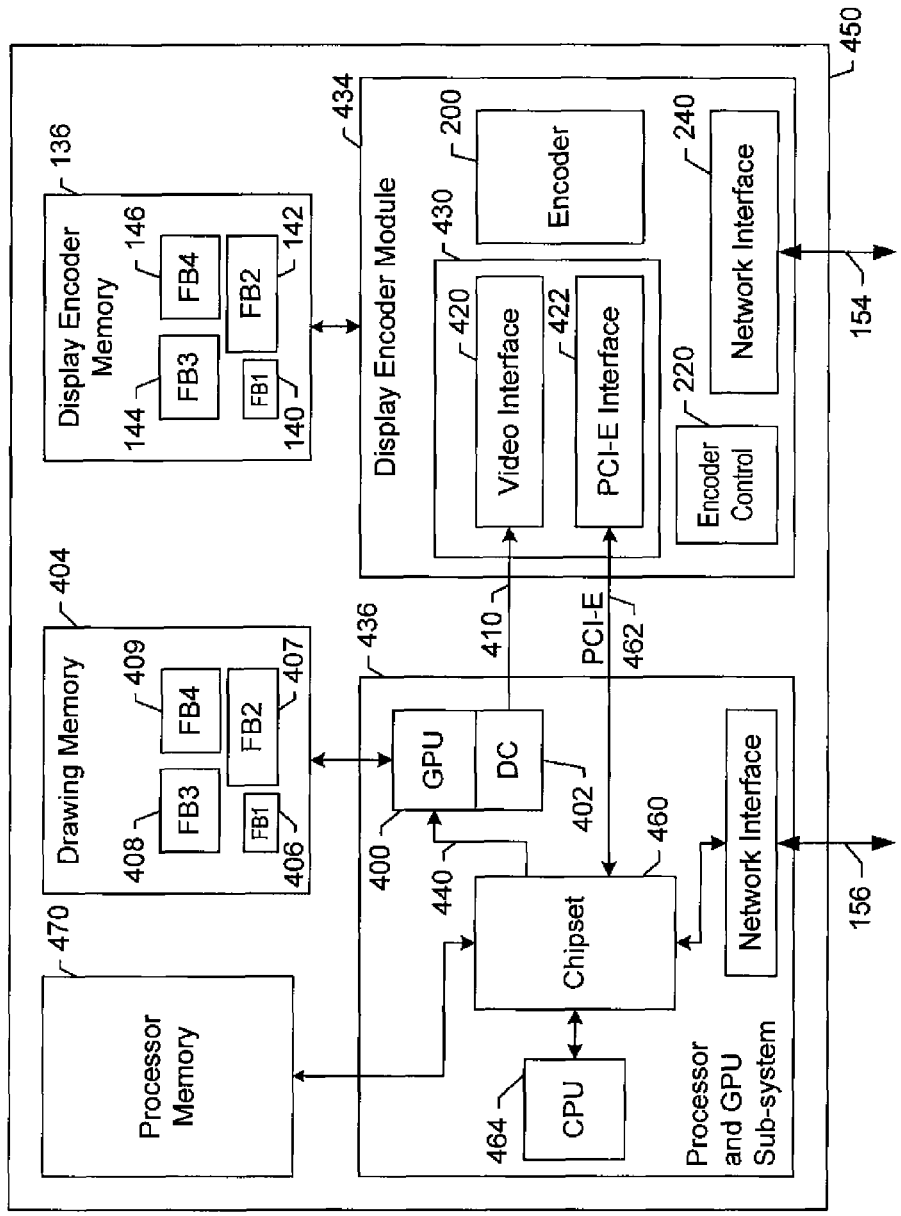
FIG. 4 shows an alternative embodiment of a host computer system that includes a GPU and display controller with dedicated drawing memory.

FIG. 4 shows an alternative embodiment of host computer system 100 with alternative processor and GPU sub-system 436 that includes GPU 400 and display controller 402 with dedicated drawing memory 404 that hosts one or more frame buffers, including frame buffers 406, 407, 408 and 409 shown. In the embodiment described, GPU 400 connects to chipset 304 by a high-speed graphics bus 440 such as a PCI-Express or AGP bus. Images are rendered by GPU 400 in drawing memory 404 and then transferred to display encoder module 434 by GPU display controller (DC) 402 using various connection methods 410. One method of transferring the frame buffer from the GPU to the display encoder module is to use a VGA connection. Another method uses a DVI connection. Yet another method uses the DPVL standard that supports the transfer of non-sequential elements using a DVI connection. Other methods include DisplayPort or Unified Display Interface (UDI) etc. Frame buffers may also be transferred from GPU 400 to display encoder module 434 across PCI-Express bus 300. Processor interface and registers 430 of display encoder module 434 includes video interface 420 that connects to display controller 402 and PCI-Express interface 422. Video interface 420 depends on the embodiment of display controller 402 and may be a VGA, DVI, DPVL, DisplayPort or other digital video interface. Note that while FIG. 4 refers to independent processor memory 132 and drawing memory 404, it is equally applicable to architectures where the different functions of these memory systems is not clearly distinguished. Note also that while the embodiment refers to CPU 302, GPU 400 and display controller 402 as distinct and independent components, it is equally applicable to architectural variations that blend these functions.

Figure 5:
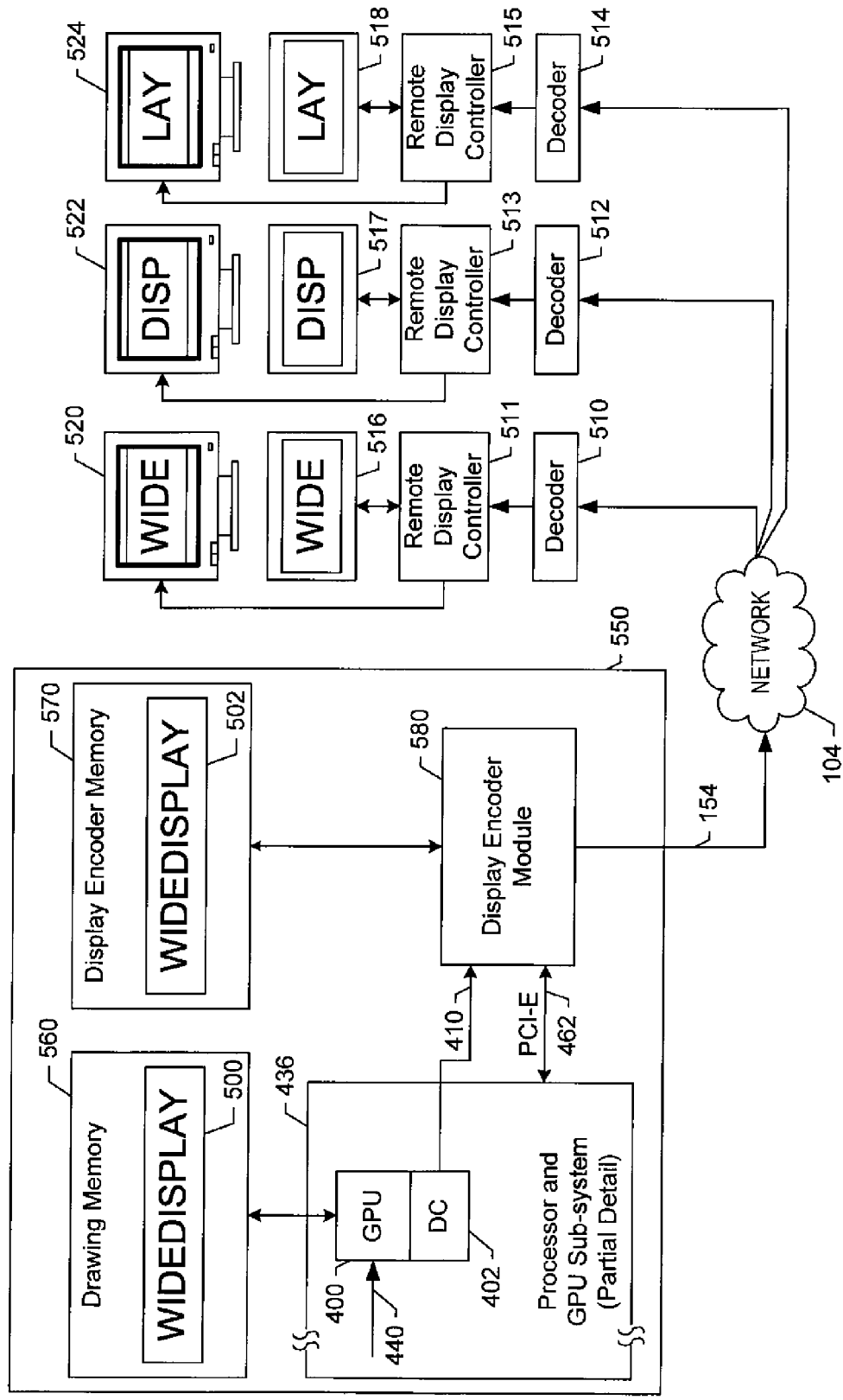
FIG. 5 shows an embodiment that supports a wide display format.

FIG. 5 shows an embodiment of the invention that supports a wide display format. In the embodiment, GPU 400 works with wide format frame buffer 500 and operates in the same manner as if connected to a single, wide display system. Display encoder module 434 receives video signal 410 in a format as previously described and stores the image in wide frame buffer 502 of display encoder memory 136. Display encoder module 434 then processes the image and sends different sections of the image across network 104 to different decoders 510, 512 and 514 shown. In FIG. 5, image sections decoded by decoder 510 are stored in remote frame buffer 516 and displayed on remote display 520 by remote display controller 511. Similarly, image sections stored in remote frame buffer 517 are displayed on remote display 522 and image sections stored in remote frame buffer 518 are displayed on remote display 524. In this embodiment, display encoder module 434 controls the order and position of the display arrangement. In an embodiment, display controller 402 and display encoder module 434 also control the update rate of wide frame buffer 502 which does not affect the refresh rate of remote displays 520, 522 or 524 shown. This allows display update rates to be lower than refresh rates in environments where the network has limited bandwidth available for display information.

Figure 6:
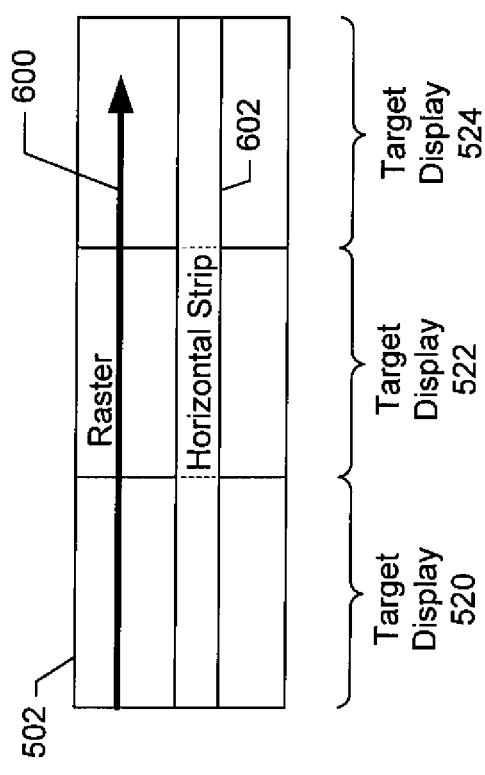
FIG. 6 illustrates the order in which a wide display frame buffer is processed in an example in which the frame buffer has the equivalent width of three remote displays.

FIG. 6 illustrates the order in which wide display frame buffer 502 is processed in an example in which frame buffer 502 has the equivalent width of three remote displays, such as the wide display system presented in FIG. 5. As a first step, display encoder module 134 (in FIG. 5) waits for raster signal 600 to load all of wide frame buffer 502. As a second step, the image is processed in horizontal strips that span the entire wide frame buffer. Horizontal strip 602 shown is one such strip. As a third step, the image data is encoded using methods described previously and transmitted to designated remote display 520, 522 or 524 in FIG. 5.

In cases where the frame update rate is different to the display refresh rate, various techniques are available to decode the frames. In a first embodiment, a double buffer method is used to eliminate tearing problems associated with asynchronous systems. In another embodiment, a single buffer method is used. This method has a lower latency than the first method but does not eliminate the tearing of screens. An alternative method is to synchronize refresh rate of the remote display to a multiple of the refresh rate of GPU 400. This method prevents any movement in the tear line and it may be precisely positioned with proper phase control of the update and refresh timing. One example is to use an update rate exactly half the refresh rate and to position the tear line within the vertical retrace so that is not observable.

One method of increasing the update rate involves selective processing and transmission of frame buffer data. Using this method, display controller 402 knows which regions of drawing memory 404 should be updated and transmits only those regions. One method for achieving this is to use a non-sequential video communications protocol like DPVL.

In order to improve the response time of pointing devices, display encoder module 134 may obtain pointer location and type information from processor and GPU sub-system 130 rather than waiting for it to arrive from DVI signal 410. This may be accomplished by either monitoring a pointer control register or receiving pointer commands directly from the operating system of processor and GPU sub-system 130. In cases where this method of pointer display is implemented, the remote display decoder includes pointer hardware that turns the pointer on and off as it is moved between displays.

Figure 7:
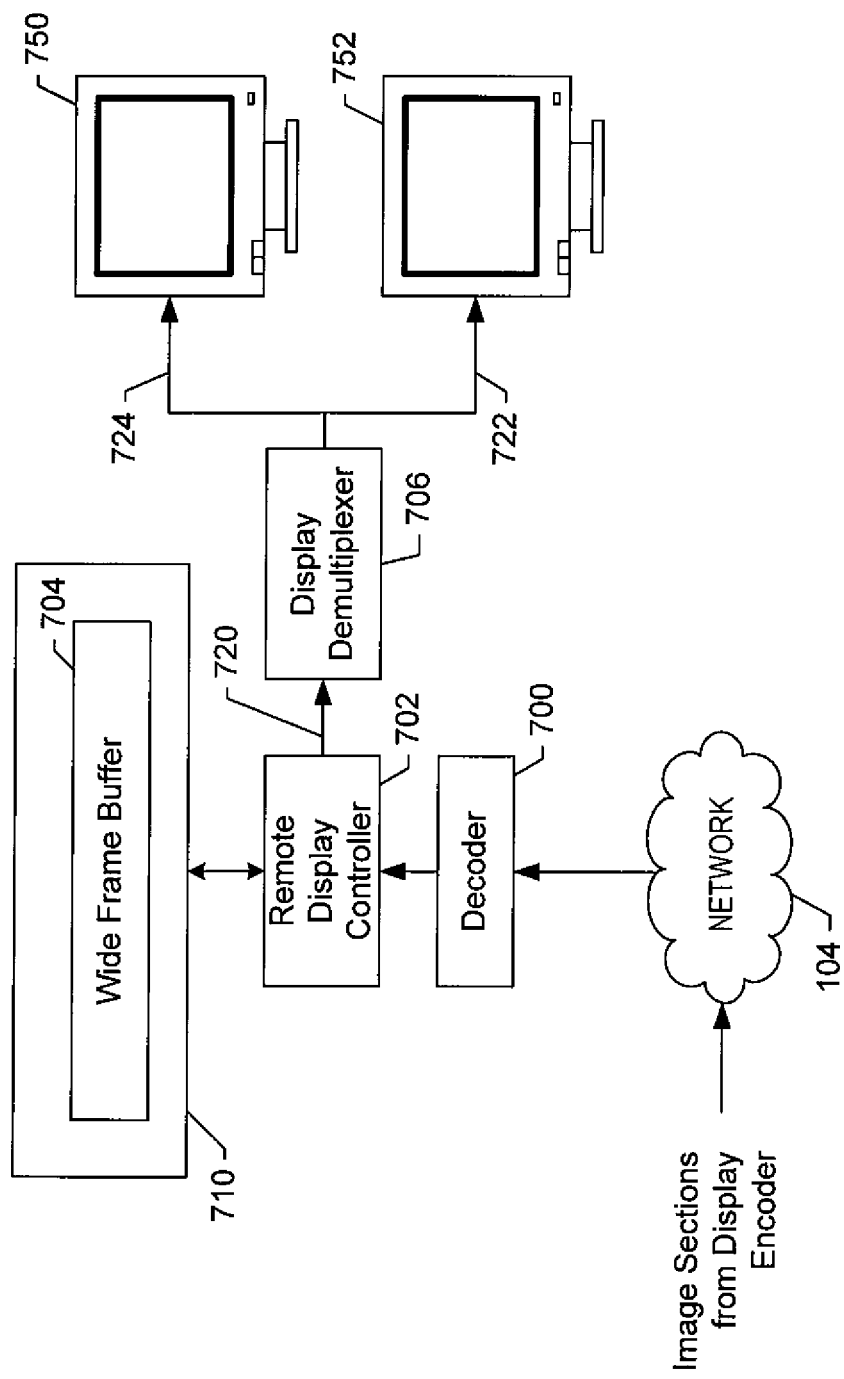
FIG. 7 illustrates a remote system that supports multiple displays.

FIG. 7 illustrates a remote system that supports multiple displays. Remote display decoder 700 is connected to network 104. Remote display controller 702 is connected to decoder 700. Incoming images from host computer system 100 are decoded and stored across multiple frame buffers that combine to form virtual wide frame buffer 704. Remote display controller 702 sequences display signal 720 to include the data for multiple displays. External display de-multiplexer 706 decodes signal 720 and turns it into multiple streams 722 and 724 that are compatible with standard displays. Examples include separate VGA, DVI, or DPVL signals.

The use of multiplexed signal 720 minimizes the complexity of display de-multiplexer 706. In one embodiment, de-multiplexing is alternated on each pixel between the displays. This method is applicable to displays of the same size and frequency. In another embodiment, multiplexed signal 720 is run at double the frequency. In yet another embodiment, frames containing multiple pixels are transmitted to each display in a sequence where each frame size is proportional to the relative pixel frequency of each display. It should be noted that this only works with a digital display capable of handling the jitter. Alternatively, analog displays may be supported by using a Phase Lock Loop (PLL) to generate multiple pixel clocks.

An enhancement on this method is to use a multiplexed signal that works on a standard signal set. For example, a double frequency Digital Video Out (DVO) signal may be implemented with additional control pins to support the de-multiplexing. This mechanism can then be used to directly drive a single DVO to DVI connector or a single DVO to VGA connector. Alternatively, two DVO to DVI connections or two DVO to VGA connections may be implemented using a de-multiplexing circuit.

One alternative embodiment of the remote display system shown in FIG. 7 involves a modification that controls the DVI clock. Referring to FIG. 7, remote display controller 702 sends an image to remote display 750, one frame at a time. In the embodiment, remote display 750 incorporates a frame buffer and is capable of storing at least one image frame. When remote frame buffer 710 has been updated by host computer system 100, display de-multiplexer 706 is scheduled to transmit updated frame 710 to designated attached display 750 or 752. The DVI clock is shut down during periods when no frame is being updated and is restarted once a new frame is ready; all the while maintaining the same pixel and blanking count to remain synchronized.

In an embodiment, a structure having an inverse function of de-multiplexer 720 at host computer system 100 is included to multiplex two or more frame buffer sources into a single frame buffer input stream. In a multi-user system embodiment, display encoder module 134 maintains a copy of the display controller interface for each user.

In an alternative embodiment, a multi-user system such as that illustrated in FIG. 1 may be combined with a multi-display system such as the system shown in FIG. 5. This embodiment supports multiple users, each user with multiple displays.

Figure 8:
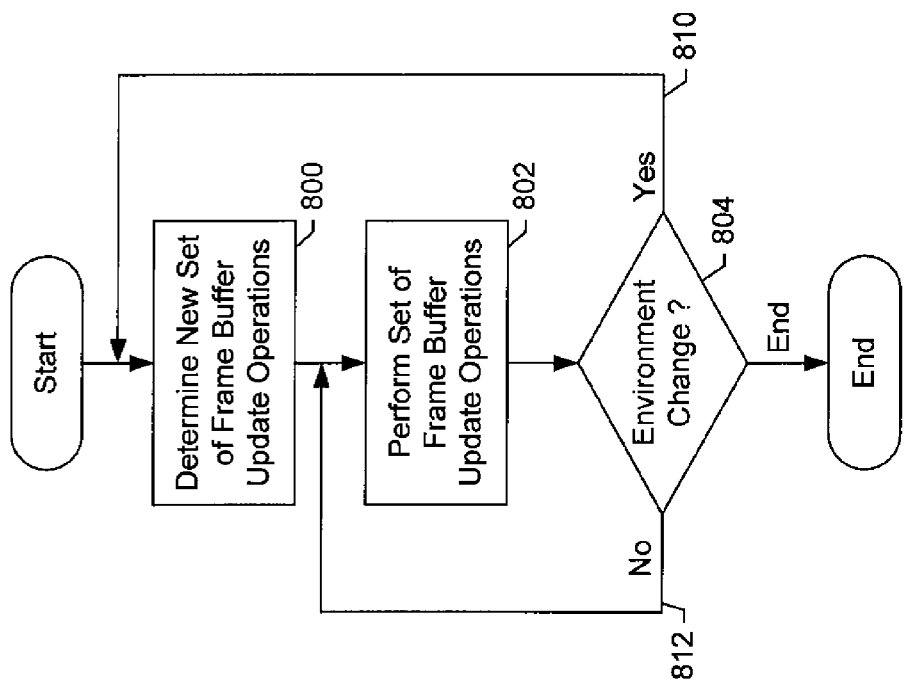
FIG. 8 illustrates a method for updating remote displays.

FIG. 8 shows a method used by display encoder modules 134 or 434 to update the associated remote displays based on a determined set of update operations. After initialization, a new set of frame buffer update operations is determined at step 800. As one example of a set of update operations, an encoding sequence is established where all frame buffers are given equal priority and are encoded at the same update rate. As another example, different frame buffers or different areas of one frame buffer are encoded using different update rates. As another example, different frame buffers are updated at the same rate but using different encoding techniques which results in a change in proportional bandwidth used for the transfer a frame buffer to an associated remote display system. Another set of frame buffer update operations controls proportional bandwidth by combining different sequences and update rates with different encoding techniques. In an embodiment, the assignment of update rates and encoding techniques is based on display characteristics, frame buffer content or update history information, image content or other attributes. In an embodiment, a set of frame buffer update operations is determined based on frame buffer pixel resolution and size. In the embodiment, display encoder 200 provides proportional network bandwidth allocation based on relative frame buffer sizes. In another embodiment, a set of frame buffer update operations 800 is determined based on frame buffer content. In the embodiment, image decomposition module 202 classifies frame buffer contents as previously described.

The bandwidth of network link 154 is then allocated amongst competing remote systems based on frame buffer content. For example, a frame buffer containing a video sequence may receive proportionally higher update rate than a frame buffer containing text. In another embodiment, a more active display associated with a multi-display desktop may receive proportionally higher update rate. For example, wide display frame buffer 502 is associated with a multi-display system incorporating monitors 520, 522 and 524. In the example, a pointing device sprite provides display encoder module 434 with an indication of which area of wide display frame buffer is active. Display encoder module 434 then uses a framebuffer update sequence that has a higher update rate for the active section. In another example, processor and GPU sub-system 130 or 436 may determine frame buffer update sequence 800. In such an embodiment, processor and GPU sub-system 130 or 436 instructs display encoder module 134 or 434 as to which update rate and encoding method to use for each frame buffer, enabling different service qualities for different remote systems or different service qualities for different sections of one or more displays. In advanced systems, techniques such as forward error correction may be used to enable a higher service quality for selected remote displays.

As a next step 802, a set of update operations is performed. In an embodiment, performing the set of update operations is a repetitive process in which frame buffer sections are sequentially either encoded or skipped over based on the update rates established in step 800 and then transmitted to target remote decoders over a shared network. The process is repeated for a fixed multiple of the lowest update rate to ensure all regions are encoded and transmitted. Other sequences, such as time-based sequences, sequencing as permitted by available processing resources, and sequencing determined by a subset of display regions at a time are also feasible.

As a next decision step 804, a determination is made as to whether the environment has changed. If the environment has changed (reference numeral 810), control returns to step 800 and a new set of frame buffer update operations is determined. If the environment is unchanged (reference numeral 812), the established set of frame buffer update operations 802 is repeated. An environment change may be determined based on changes to frame buffer, remote display or other attributes. As one example, a change in pixel resolution of a remote display is detected. This may occur if a display is re-configured or physically replaced with another of different resolution. Such changes are detected by processor and GPU sub-system 130 or 436 (e.g. as provided by DDI information) and result in a corresponding change to the frame buffer size in display encoder memory 136. As another example, the image content of a frame buffer, as determined by image encoder 200, may be detected. Such a change is detected at the end of a video sequence or launch of a different application. As another example, a new frame buffer is added as may occur when an additional display is added to the system. As another example, a change in network bandwidth, congestion level or packet loss metric is detected and a new update sequence is determined.

While methods and apparatus for enabling multiple remote displays has been described and illustrated in detail, it is to be understood that many changes and modifications can be made to various embodiments of the present invention without departing from the spirit thereof.

What is claimed is:

1. A host computer comprising:
   at least one processing unit comprising a processor memory having instructions executed by the at least one processing unit;
   a display encoder memory independent of the at least one processing unit;
   an Ethernet network connection independent of the at least one processing unit; and
   a multi-method display encoder module comprising a lossless image encoder and a lossy image encoder, the multi-method display encoder module independent of the at least one processing unit and in communication with the display encoder memory and the at least one processing unit, the display encoder module in communication with clients over a standard corporate Ethernet network via the Ethernet network connection,
   wherein the multi-method display encoder module is enabled to obtain visual data from the at least one processing unit,
   wherein the display encoder memory comprises a plurality of encoder frame buffers configured to store the visual data obtained from the at least one processing unit, each encoder frame buffer in the plurality of encoder frame buffers associated with a different client display in a plurality of client displays connected to the host computer via the standard corporate network, each client display associated with one of the clients,
   wherein the multi-method display encoder module compresses the visual data stored in each encoder frame buffer in the plurality of encoder frame buffers using at least one of a set comprising the lossless image encoder and the lossy image encoder to form a plurality of encoded images, and sends each in the plurality of encoded image across the standard corporate Ethernet network to the associated client display, and
   wherein the at least one processing unit executes the instructions stored in the processor memory to render at least one different image for each encoder frame buffer in the plurality of encoder frame buffers, each rendered image placed in at least one of the plurality of encoder frame buffers at a pixel resolution and size for which the image is to be displayed on the encoder frame buffer's associated client display, the size accommodating the rectangular dimension of an associated client's display's display area.

2. The host computer of claim 1, wherein the independent of the at least one processing unit for the multi-method display encoder module comprises, communications between the at least one processing unit and the multi-method display encoder module primarily enabled to communicate digital image data.

3. The host computer of claim 1, wherein the at least one processing unit comprises a graphics processing unit.

4. The host computer of claim 1, further comprising a second Ethernet network connection, the second Ethernet network connection disposed between the at least one processing unit and the standard corporate Ethernet network, wherein the multi-method display encoder sends each of the plurality of encoded image across the standard corporate Ethernet network to the associated client display independent of the second Ethernet network connection.

5. A method of transmitting visual data from a host computer to a plurality of displays across a standard corporate Ethernet network, comprising:
   storing visual data in a plurality of frame buffers, each frame buffer of the plurality of frame buffers associated with one from the plurality of displays;
   determining a frame buffer update sequence, the frame buffer update sequence comprising compression operations for the stored visual data in the each frame buffer in the plurality of frame buffers;
   reading the stored visual data in the plurality of frame buffers in accordance with the determined frame buffer update sequence;
   compressing the read visual data to yield a plurality of packetized encoded images; and
   sending each of the plurality of packetized encoded images across the standard corporate Ethernet network to the one from the plurality of displays associated with the frame buffer from which the compressed image was derived.

6. The method of claim 5, wherein compressing the visual data comprises encoding a set of frame buffers, the set of frame buffers comprising spatially separate portions of a divided image, each of the spatially separate portions selected to match a resolution and size of the associated display.

7. The method of claim 5, wherein:
   determining the frame buffer update sequence comprises determining individual update rates for individual frame buffers in the plurality of frame buffers, and
   compressing the visual data comprises compressing the visual data stored in the individual frame buffers in accordance with the individual update rates.

8. The method of claim 7, further comprising adjusting a compression technique for at least one from the plurality of frame buffers to accommodate an available Ethernet network bandwidth between the host computer and the one from the plurality of displays associated with the one from the plurality of frame buffers.

9. The method of claim 5, wherein determining the frame buffer update sequence comprises determining image content of the visual data stored in the plurality of frame buffers and setting the frame buffer update sequence in accordance with the determined image content.

10. The method of claim 9, wherein:
    the determined image content comprises video content and text content, the video content comprising an image in a video sequence, the text content comprising computer generated text.

11. The method of claim 5, wherein:
    a one of the plurality of frame buffers comprises a first visual data portion and a second visual data portion;
    determining the frame buffer update sequence comprises determining different service qualities for the first and the second visual data portions; and
    compressing the visual data stored in the one from the plurality of frame buffers comprises encoding the first visual data portion and delayed encoding of the second visual data portion.

12. The method of claim 5, further comprising:
    obtaining the visual data from a second plurality of frame buffers, the second plurality of frame buffers used in the rendering of the visual data.

13. A host computer comprising:
at least one local processing unit comprising a plurality of rendering frame buffers; and
a local encoder comprising:
- an interface to the at least one local processing unit;
- a plurality of display controller register sets presented to the processing unit, via the interface to the at least one local processing unit, as a plurality of independent display controller register sets when activated, each of the plurality of rendering frame buffers associated with one from the plurality of display controller register sets; and
- a processor interface controller enabled to read the plurality of rendering frame buffers based on contents of the plurality of display controller register sets;
- wherein the local encoder is enabled to read one from the plurality of rendering frame buffers to obtain a display image, compress the image and transmit the compressed image over a standard corporate Ethernet network to a remote display system.

14. The host computer of claim 13, wherein:
the local encoder is enabled to activate one of the plurality of display controller registers sets under control of virtualization software running on the at least one processing unit, the activation used to co-ordinate the one of the plurality of display controllers register sets with a virtual machine on the at least processing unit.

15. The host computer of claim 13, wherein the at least one processing unit comprises a graphics processing unit.

16. A host computer configured for displaying a plurality of images on a plurality of remote displays, said host computer comprising:
a processing system comprising a plurality of frame buffers, the plurality of images rendered into the plurality of frame buffers by the processing system; and
an encoder, independent of the processing system, said encoder comprising:
- a processor expansion interface communicatively coupled to the processing system, the processor expansion interface enabled to support Direct Memory Access (DMA) to the plurality of frame buffers;
- an encoder control enabled to read a selective plurality of image frame portions of the plurality of images via the processor expansion interface;
- a digital image decomposition module comprising a digital image filter, the digital image filter enabled to classify each of the selective plurality of image frame portions into at least one image layer based on determining image types of each of the selective plurality of image frame portions;
- a multi-method encoder comprising a lossy image encoder and a lossless image encoder, the multi-method encoder enabled to compress the selective plurality of image frame portions by selecting at least one of a set comprising the lossy image encoder and the lossless image encoder based on the at least one image layer of each selective plurality of image frame portions to generate encoded image frame portions; and
- an IP Ethernet network interface communicatively coupled to the plurality of remote displays, the IP Ethernet network interface enable to transmit the encoded image frame portions to associated remote displays of the plurality of remote displays.

17. The system of claim 16, wherein:
the encoder further comprises an encoder memory enabled to store copies of the selective plurality of image frame portions, the copies used by the multi-method encoder to generate the encoded image frame portions, the encoder control enable to create the copies from the read selective plurality of image frame portions.

18. The system of claim 16, wherein:
the encoder comprises a first instruction set for encoding images independent of a second instruction set of the processing system.

19. The system of claim 16, wherein:
each in the plurality of frame buffers comprises an allocation of memory in the processing system, the allocation of memory associated with a display resolution of an associated one from the plurality of remote displays.

20. The system of claim 16, wherein:
the encoder control is further enabled to determine the selective plurality of image frame portions by reading a table comprising identification of changed portions of the plurality of frame buffers.

21. The system of claim 20, wherein:
the encoder control is further enabled to clear entries in the table to indicate that the identified changed portions of the plurality of frame buffers have been read by the encoder control.

22. The system of claim 20, wherein:
the processing system is enable to determine the changes to the plurality of frame buffers and update the table to identify the changed portions of the plurality of frame buffers.

23. The system of claim 16, wherein:
the encoder is enabled to repeatedly encode each of the plurality of frame buffers at an associated update rate,
the encoder is further enabled to determine a change in bandwidth of the IP Ethernet network associated with the frame buffer and to adjust the associated update rate based on the change in the bandwidth of the IP Ethernet network associated with the frame buffer.

24. The system of claim 16, wherein:
the image decomposition module is further enabled to determine the image types by obtaining interpretations of drawing commands used in the rendering of the plurality of images.

25. The system of claim 16, wherein:
the processor expansion interface comprises a plurality of registers sets, each in the plurality of frame buffers associated with a one in the plurality of registers sets, each of the plurality of register sets enabled to present an equivalent interface to a one of a plurality of virtual machines in the processing system, each of the plurality of register sets substantially dedicated to an associated one of the plurality of virtual machines.

26. The encoder of claim 16 wherein:
the image filter is enabled to identify natural images in the plurality of image frame portions;
the lossy image encoder comprises a discrete transform encoder;
the multi-method encoder encodes the identified natural images with the discrete transform encoder;
the image filter is enabled to identify at least one of a set comprising computer generated text and graphics images in the plurality of image frame portions; and
the multi-method encoder encodes the identified at least one of the set comprising computer generated text and graphics images with the lossless image encoder.

27. The host computer of claim 16 wherein:
the processor expansion interface comprises at least one of
   a set comprising:
   a computer expansion card interface, and
   a Peripheral Component Interconnect Express (PCI Express);
wherein the processor expansion interface enables read access to the plurality of frame buffers by the encoder.

* * * * *